United States Patent [19]
Kojima

[11] Patent Number: 5,410,351
[45] Date of Patent: Apr. 25, 1995

[54] VIDEO SIGNAL TRANSMISSION SYSTEM AND METHOD

[75] Inventor: Yuichi Kojima, Kanagawa, Japan

[73] Assignee: Sony Corporation, Tokyo, Japan

[21] Appl. No.: 921,340

[22] Filed: Jul. 29, 1992

[30] Foreign Application Priority Data

Jul. 31, 1991 [JP] Japan ................ 3-214659
Jul. 31, 1991 [JP] Japan ................ 3-214662
Oct. 16, 1991 [JP] Japan ................ 3-298473

[51] Int. Cl.⁶ ................ H04N 7/133; H04N 7/137
[52] U.S. Cl. ................ 348/401; 348/405; 348/419
[58] Field of Search ................ 358/133, 136, 135; H04N 7/133, 7/137; 348/401, 405, 419

[56] References Cited

U.S. PATENT DOCUMENTS

| 4,077,053 | 2/1978 | Ishiguro | 358/136 |
| 5,136,376 | 8/1992 | Yagasaki | 358/136 |
| 5,245,427 | 9/1993 | Kunihiro | 358/136 |

FOREIGN PATENT DOCUMENTS

0424060A2  4/1991  European Pat. Off. ..... H04N 7/133

Primary Examiner—Howard W. Britton
Attorney, Agent, or Firm—William S. Frommer; Alvin Sinderbrand

[57] ABSTRACT

In a video signal transmission system in which input video signals are high efficiency coded for transmitting, the high efficiency coded data are decoded with quantization information determined for each block group by the amount of the data remaining in the buffer memory. The decoded data are compared with the original video data to determine the difference data. The difference data are weighted with a flatness value which defines the degree of perceivability of the distortion. The quantization size for the video data to be transmitted actually is determined based on the difference data or the weighted difference data so that the quality of the picture to be transmitted can be improved.

14 Claims, 9 Drawing Sheets

VIDEO SIGNAL TRANSMISSION SYSTEM AND METHOD

BACKGROUND OF THE INVENTION

This invention relates to a video signal transmission system for transmitting compressed data derived from video signals, and is more particularly suitable for application to a video signal transmission system which transmits picture data compressed by the method of orthogonal transformation, such as discrete cosine transformation and the like.

In conventional video signal transmission systems, for example, picturephones or teleconference systems, which transmit video signals of moving pictures to a distant place, video signals are coded by using the correlation between frames of video signals so that more effective transmission of significant information and effective utilization of the transmission line can be achieved.

For example, in FIG. 1, pictures PC1, PC2, PC3, . . . , which constitute a moving picture, are transmitted at time $t=t_1, t_2, t_3, \ldots$, respectively. In the intra-frame coding system, these pictures are coded one-dimensionally on the same line and then transmitted.

On the other hand, the inter-frame coding is carried out to improve compression efficiency by obtaining the video data PC12, PC23, . . . which represent the differences between the neighboring pictures (i.e., between PC1 and PC2, between PC2 and PC3, etc.) based on the autocorrelation of the video signal on the time axis.

Thus, the video signal transmission system can transmit the pictures PC1, PC2, PC3, . . . on a transmission line as high efficiency coded digital data whose size is extremely small compared to uncompressed picture data.

That is, as shown in FIG. 2, in a video-signal-transmission-system 1, a preprocessing circuit 2 processes an input video signal VD by frequency-band limiting, output sequence exchanging, etc. and outputs an input video data S1.

In the above operation, the video data which are sequentially supplied as input video data S1 are extracted from the frame video data FRM by the method shown in FIG. 3.

Video data of each frame FRM are divided into 2 (horizontal)×6 (vertical) block groups GOB. Each block group GOB includes 11 (horizontal)×3 (vertical) macro-blocks MB, and each macro-block MB has brightness signals $Y_1$, through $Y_4$ corresponding to 8×8 picture elements and color difference signal data $C_b$ and $C_r$ which are composed of color difference signals corresponding to the above stated picture elements.

In a block group GOB, macro-blocks MB are arrayed in the order of the consecutive video data, and corresponding micro-blocks are arrayed in each macro-block in the order of raster scanning.

With regard to the brightness signals, each macro-block MB has video data corresponding to 16×16 picture elements (Y1 through Y4) as a unit which are arranged in consecutive order in both the horizontal and vertical directions. Regarding the two color differential data corresponding to these picture elements, the amount of the data is compressed and multiplexed on the time axis. Thereafter, the data corresponding to 16×16 picture elements are allocated to each micro-block $C_r$ and $C_b$.

When both the input video data S1 and the previous-frame data S2 supplied from the previous-frame memory 4 are sent to the difference-data generation circuit 3, the difference between the input video data S1 and the previous-frame data S2 is determined and inter-frame coded data S3 is generated. The difference data S3 are supplied to both the discrete cosine transformation (DCT) circuit 6 through the switching circuit 5 and to the switching control circuit 7.

The switching circuit 5 is controlled by the control signal S4, supplied from the switching control circuit 7, so that the input video signal S1 is output if it is determined that intra-field coding would give a lesser amount of transmission data. If, however, it is determined that interframe coding would give the lesser amount of transmission data, the difference data S3 is output.

The discrete cosine transformation circuit 6 for discrete cosine transforming the input video data S1 or the difference data S3 of each micro-block based on the two-dimensional correlation of the video signal. Thereafter, the transformation data S5 obtained as a result of this transformation is supplied to quantization circuit 8.

The quantization circuit 8 quantizes the transformation data S5 with a quantization step size which is determined for each block group GOB. Quantization data S6 which is output from quantization circuit 8 are supplied to the variable length code (VLC) circuit 9 and to the inverse quantization circuit 12.

The variable length code circuit 9 performs variable length coding for the quantization data S6 and outputs transmission data S7, which are supplied to the transmission buffer memory (BM) 10.

The transmission buffer memory 10 temporarily stores the transmission data S7 in a memory store and then outputs the stored data to the transmission line 11 as output data S8. Transmission buffer memory 10 further supplies the quantization control signal S9 back to the quantization circuit 8 for controlling the value of the quantization step size based on the amount of the residual data remaining in the memory store.

In other words, the transmission buffer memory 10 adjusts the amount of data which are generated as the quantization data S6 for maintaining the proper amount of residual data in the memory (in order to avoid an overflow or underflow of data).

If the amount of the residual data remaining in the transmission buffer memory 10 increases and reaches the maximum amount allowed, the transmission buffer memory 10 supplies the quantization control signal S9 for increasing the quantization step size (see FIG. 4) so that the amount of quantization data S6 decreases.

Conversely, if the amount of the residual data remaining in transmission buffer memory 10 decreases and reaches the minimum amount allowed, transmission buffer memory 10 supplies the quantization control signal S9 for decreasing the quantization step size so that amount of quantization data S6 increases.

The inverse quantization circuit 12 performs inverse-quantization on the quantization data S6 received from the quantization circuit 8 and outputs inverse quantization data S10. Thus the quantization data S6 are decoded into the inverse quantization data corresponding to such data prior to being supplied to the quantization circuit 8. The inverse quantization data S10 are supplied to the inverse discrete cosine transformation circuit 13.

The inverse discrete cosine transformation circuit 13 transforms the inverse quantization data S10, which are decoded by inverse quantization circuit 12, into the decoded video data S11 by a transformation process which is inverse to the transformation process of the discrete cosine transformation circuit 6. The decoded video data S11 are supplied to the previous-frame data generation circuit 14 and to the switching circuit 15.

Decoded video data S11 is therefore the inverse discrete cosine transformation identical to either the input video data S1 or the differential data S3 depending on switching circuit 5 (not yet transformed witch the discrete cosine transformation circuit 6).

That is, the inverse discrete cosine transformation circuit 13 produces data identical to the input video data S1 when the video signal VD is transmitted with intrafield coding, but if the video signal VD is transmitted with inter-frame coding, circuit 13 produces data identical to the difference data S3.

The previous-frame data generation circuit 14 reproduces the previous-frame video data corresponding to the data which was sent out as the output data S8, by adding the decoded video signal S11 and the previous-frame data S2 fed back from the previous-frame memory 4. This reproduced video data is sent to the previous-frame memory 4 through the switching circuit 15 and thus the pictures sent to receivers are reproduced sequentially and stored in the previous-frame memory 4.

The switching operation of the switching circuit 15 is controlled by the control signal S4 which is delayed at the delay circuit 16 for the amount of time required for the video signal VD to be processed through the aforestated circuits and supplied to the switching circuit.

However, the conventional video transmission system 1 described above has the following problems.

The amount of data generated from the quantization circuit 8 for each block group GOB are quantized based on the amount of the residual data remaining in the transmission buffer memory 10. However, the residual data exhibits two patterns; a pattern which can be easily distorted and a pattern which is not easily distorted. Since a conspicuous degradation of picture quality occurs in the pattern which can be easily distorted, a constant picture quality cannot be obtained.

In the case when the amount of transmission information fluctuates drastically at local areas of a picture, for example a picture of a rotating water wheel, a, certain block of plural blocks MB constituting block group GOB contains the picture information of both fine and flat structures. Therefore, if the quantization step size is set to an averaged value, distortion concentrates locally at the block including the vanes of the water wheel wherein the patterns of the vanes might become dim or blocks on the peripheral flat portion may appear distorted.

The discrete cosine transformation system has a further disadvantage in that distortion spreads over the entire block. Therefore distortion depends on the pattern of the picture to be transmitted, and distortion fluctuates. In the high quality picture transmission system, since it is important to obtain stable and uniform picture quality independent of the content of the picture to be transmitted, distortion is a major problem.

The pictures to be transmitted may contain some areas that visually appear distorted, while other areas do not appear distorted. Distortion appears visible depending on the brightness level of each block of the picture.

In particular, the boundaries or "edges" of the image do not appear distorted, while the remaining "flat" portions appear distorted. For example, PC1 in FIG. 1 comprises an image of a torso and head. The "edges" relate to the outline of the torso and head that will appear undistorted, while the "flat" portions relate to the remainder (white) portions of the picture which may appear distorted.

For high quality transmissions, the image must be transmitted without variations in the level of distortions. However, in conventional video system transmission systems, the picture quality of transmitting images having various edges and flat portions is poor.

SUMMARY OF THE INVENTION

In view of the foregoing, an object of this invention is to provide a video signal transmission system which can transmit picture signals having uniformity in picture quality over the entire input picture, even if the input pictures comprise radically varied edge and flat portions.

Another object of the invention is to provide a video signal transmission system in which distortion of the flat portion, which visually appears distorted, is not concentrated so that the transmission picture in quality is improved.

According to one aspect of this invention, a video signal transmission system is provided: for orthogonally transforming an input video signal, which is constituted by unit block groups each having a plurality of unit blocks, into coefficient data. A local decoder is provided for quantizing and inverse-quantizing the coefficient data based on first quantization information determined for each of the unit blocks. The local decoder further inverse-orthogonally transforms the quantized and inversely quantized coefficient data. A difference data detecting circuit detects difference data between the data decoded by the local decoder and the corresponding input video signal. A quantizing controlling circuit determines second quantization information for each of the unit blocks based on the difference data. Based on the first quantization information and the second quantization information, a quantizer determines a quantizing size of the coefficient data.

According to another aspect of this invention, a video signal transmission system is provided for orthogonally transforming an input video signal, which is constituted by unit block groups each having a plurality of unit blocks constituted by picture elements, into coefficient data. A local decoder is provided for quantizing and inverse-quantizing the coefficient data based on first quantization information determined for each of the unit blocks. The local decoder further inverse-orthogonally transforms the quantized and inversely quantized coefficient data. A difference data detecting circuit detects difference data between the data decoded by the local decoder and the corresponding input video signal. A flatness detecting circuit is provided for detecting flat portions of each picture element constituting each of the unit blocks. A quantizing controlling circuit determines second quantization information for each of the unit blocks based the detected flat portions and on the difference data. On the basis of the first quantization information and the second quantization information, a quantizer determines a quantizing size of the coefficient data.

According a further aspect of this invention, a video signal transmission method orthogonally transforms an input video signal, which is constituted by unit block groups each having a plurality of unit blocks, into coefficient data. The coefficient data is quantized and inverse-quantized based on first quantization information determined for each of the unit blocks. The quantized and inversely quantized coefficient data is then inverse-orthogonally transformed. Difference data between the inverse-orthogonally transformed coefficient data and the corresponding input video signal is detected and second quantization information for each of the unit blocks is determined based on the difference data. A quantizing size of the coefficient data is determined on the basis of the first quantization information and the second quantization information.

According to still a further aspect of this invention, a video signal transmission method orthogonally transforms an input video signal, which is constituted by unit block groups each having a plurality of unit blocks constituted by picture elements, into coefficient data. The coefficient data is quantized and inverse-quantized based on first quantization information determined for each of the unit blocks. The quantized and inversely quantized coefficient data is then inverse-orthogonally transformed. Difference data between the inverse-orthogonally transformed coefficient data and the corresponding input video signal is detected. Flat portions of the picture elements constituting the unit blocks are detected and second quantization information for each of the unit blocks are determined based on the detected flat portions and the difference data. A quantizing size of the coefficient data is determined on the basis of the first quantization information and the second quantization information.

The nature, principle and utility of the invention will become more apparent from the following detailed description when read in conjunction with the accompanying drawings in which like parts are designated by like reference numerals or characters.

DETAILED DESCRIPTION OF THE INVENTION

Figure 1:
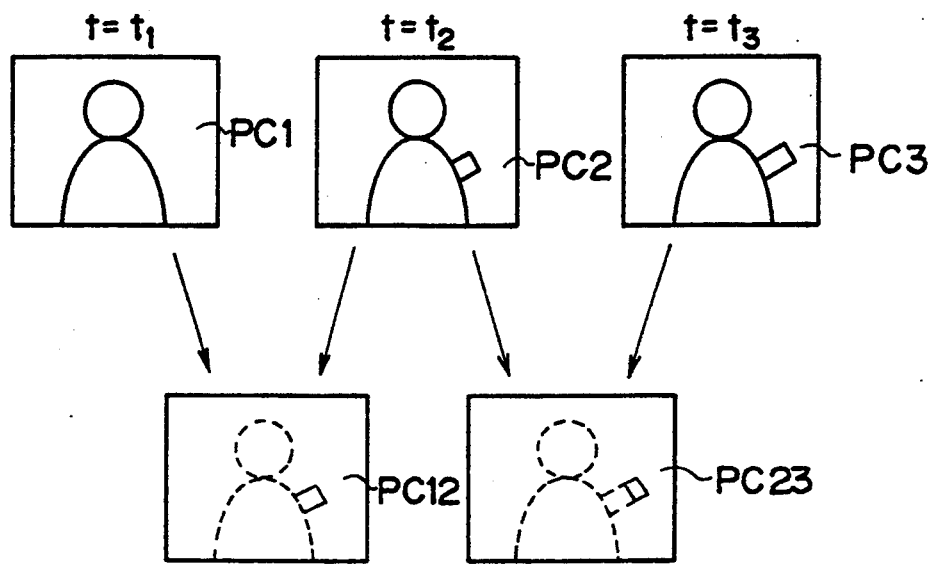
FIG. 1 is a schematic representation for explaining intra-frame and inter-frame coding.
Figure 4:
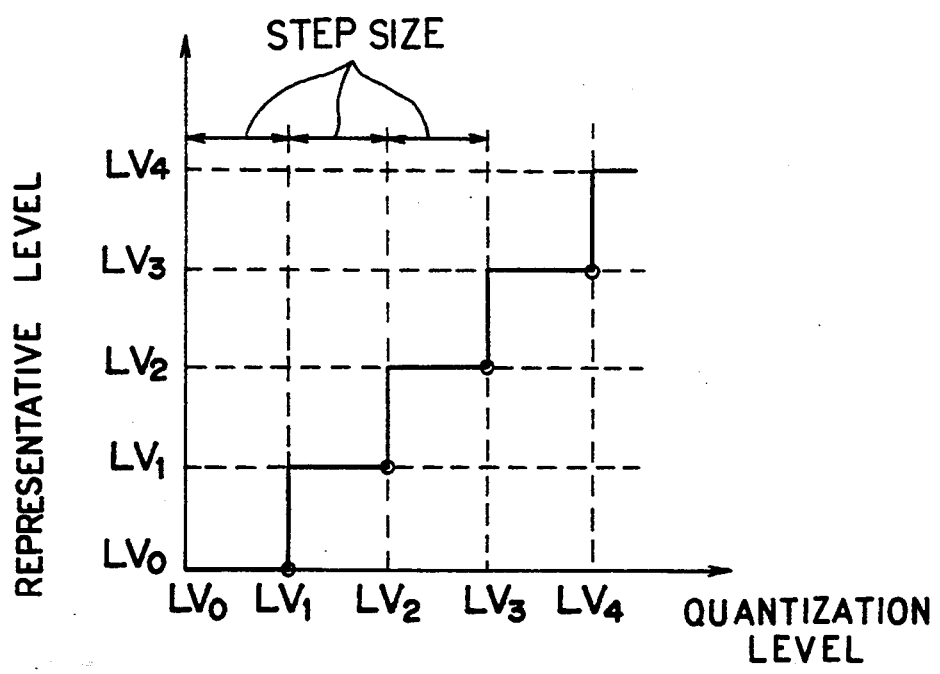
FIG. 4 is a schematic representation for explanation of quantization steps.
Figure 2:
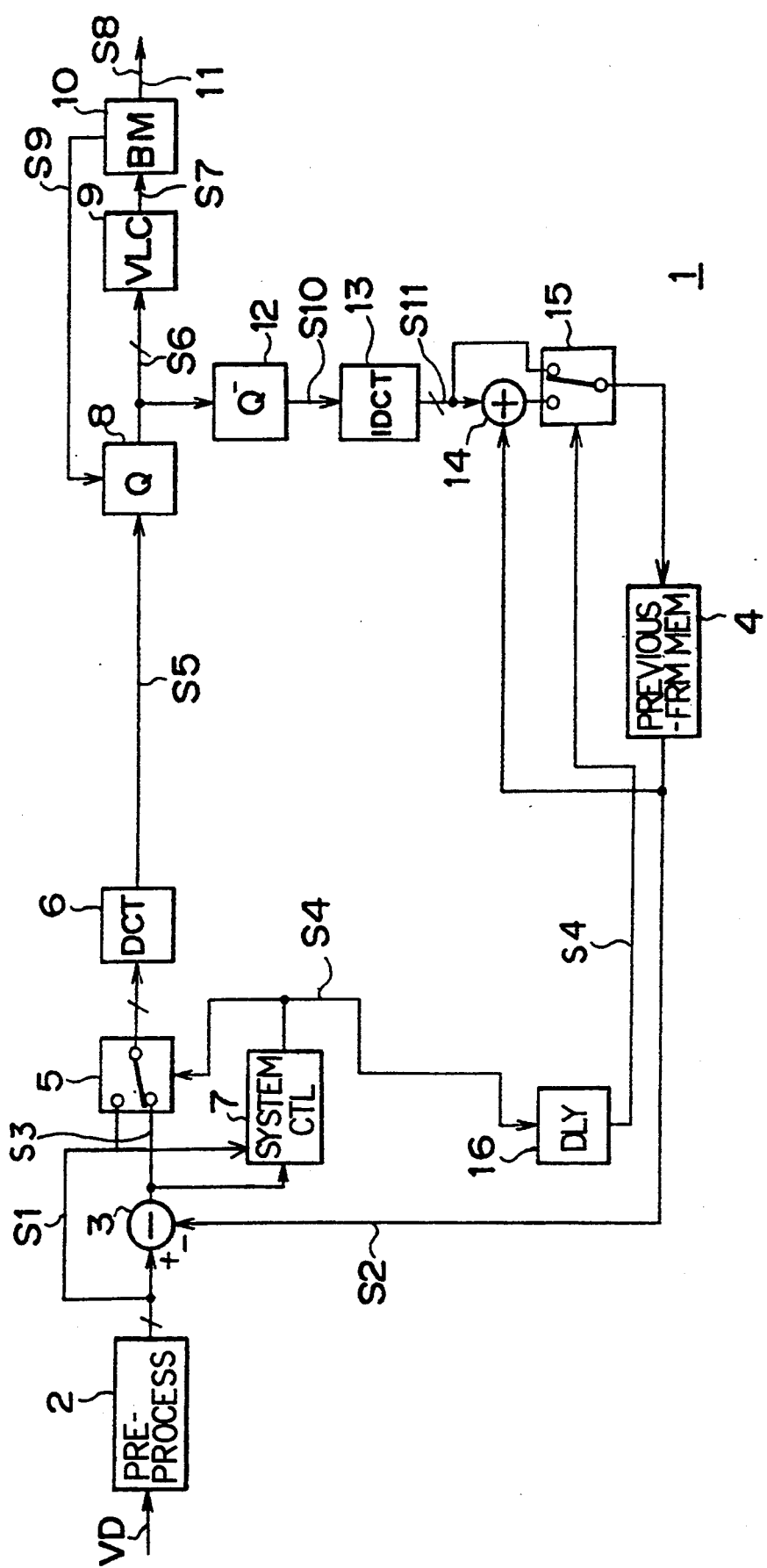
FIG. 2 is a block diagram of a conventional video data transmission system.
Figure 3:
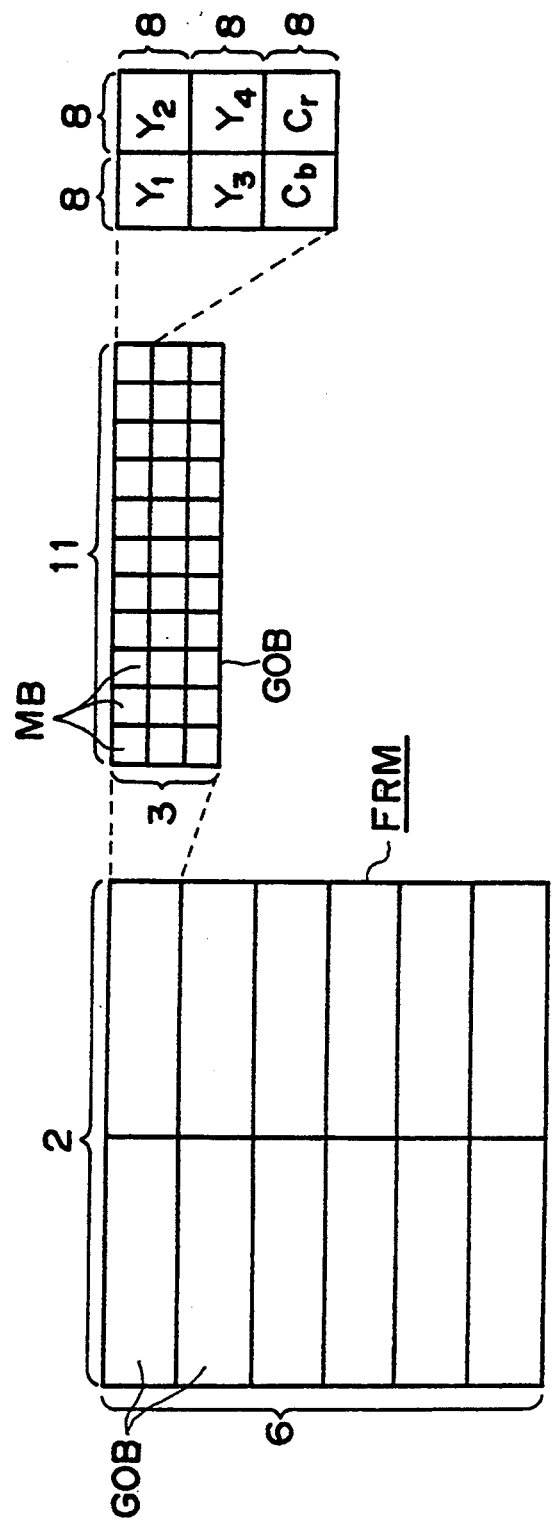
FIG. 3 is a schematic representation showing constitution of video data of a frame.
Figure 5:
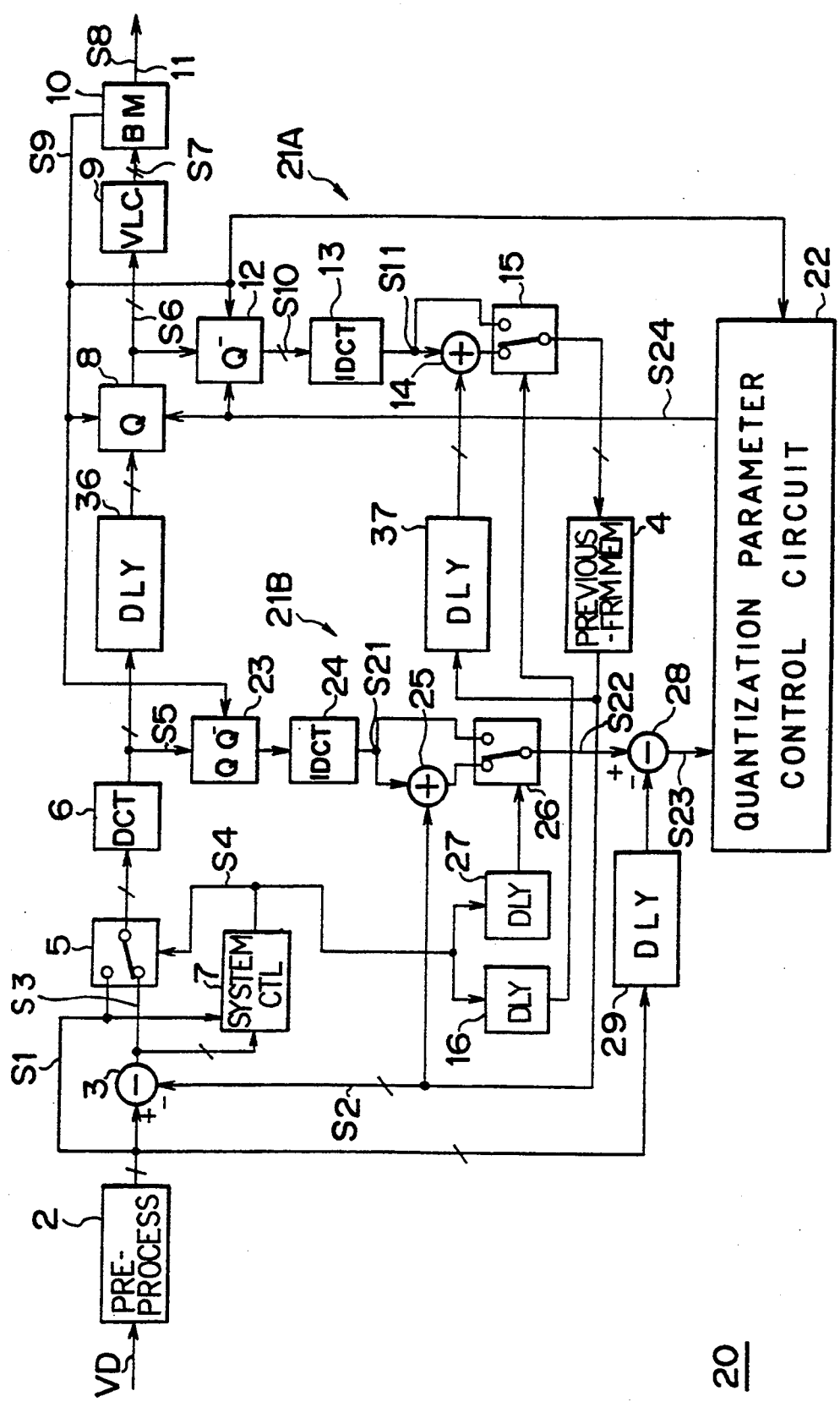
FIG. 5 is a block diagram of a video data transmission system embodying the present invention.

Preferred embodiments of this invention will be described with reference to the accompanying drawings:

FIG. 5 shows the video data transmission system 20 which comprises some similar elements as shown in FIG. 2 and like parts are designated by like reference numerals in FIG. 2.

Elements illustrated in FIG. 5 that are not shown in FIG. 2 include the first local decoding circuit block group 21A comprising the inverse quantization circuit 12, the inverse discrete cosine transformation circuit 13, and the previous-frame data generation circuit 14. Further, the second local decoding circuit block group 21B and the quantization parameter control circuit 22, which controls quantization parameters of each block of the pictures to be transmitted based on the decoding results given by the first and second local decoding circuit block group 21A and 21B, are also not shown in FIG. 2.

The second local decoding circuit block group 21B detects the distortion of the transformation data S5 compared with the original video data before the transformation data S5 are actually quantized with the quantization circuit 8. The distortion is detected by decoding the transformation data S5 which is the output from the discrete cosine transformation circuit 6.

In the above operation of the second local decoding circuit system 21B, the transformation data S5 from the discrete cosine transformation circuit 6 are supplied to quantization/inverse-quantization circuit (QQ$^-$) 23 which comprises read only memory.

Coefficients of the data which are transformed by discrete cosine transformation circuit 6 are quantized (i.e. classified) based on the quantization performance determined by the quantization control signal S9 for each block group GOB, fed back from the transmission buffer memory 10. Thereafter, the quantized data are converted by inverse quantization (i.e., converted into representative values) and supplied to the inverse discrete cosine transformation circuit 24.

The inverse discrete cosine transformation circuit 24 transforms the representative values by inverse discrete cosine transformation to get the inverse transformation data S21, which are supplied to the addition circuit 25 and to the switching circuit 26.

Then, the addition circuit 25 adds the inverse transformation data S21 to the local decoding data S2 of the previous frame stored in the previous-frame memory 4, which is decoded and supplied to the switching circuit 26.

The switching circuit 26 is controlled by the control signal S4 with the delay at delay circuit 27 for the amount of time needed for the second local decoding circuit block group 21B to perform the signal processing for the video data (from the discrete cosine transformation circuit 6 through the inverse discrete cosine transformation 24). Thus, the proper local decoding data S22 is selected and sent to the distortion calculation circuit 28 depending on whether the present video data to be transmitted on transmission line 11 are encoded by inter-field coding or by inter-frame coding.

The distortion calculation circuit 28 calculates the magnitude of distortion by calculating the difference between the original input video data S1 received from the delay circuit 29 and the local decoding data S22 received from the switching circuit 26. The calculated magnitude distortion data S23 is supplied to the quantization parameter control circuit 22.

The delay circuit 29 is constituted by a FIFO (first in first out) memory for sequentially delaying the input video data S1 for the amount of time needed for the input video signal S1 to be processed from the discrete cosine transformation circuit 6 through the local decoding circuit 25.

The quantization parameter control circuit 22 supplies a quantization control signal S24 to the quantization circuit 8 for controlling the quantization step size for each block of the video data. The quantization step size is based on the distortion data S23 received from the distortion calculation circuit 28 and on the quantization control signal S9 for each block group GOB received from the transmission buffer memory 10.

Thus, the quantization parameter control circuit 22 locally controls the quantization step size for each block before the video data are actually transmitted, to the extent that it does not affect smoothing of the amount of generated information of the video data.

Hence, even for a block in the same block group GOB, the quantization step size can be reduced for a block having a large amount of distortion and, in contrast, the quantization step size can be increased for a block having a small amount of distortion, so that a high picture quality of the video signal to be transmitted is maintained.

Figure 6:
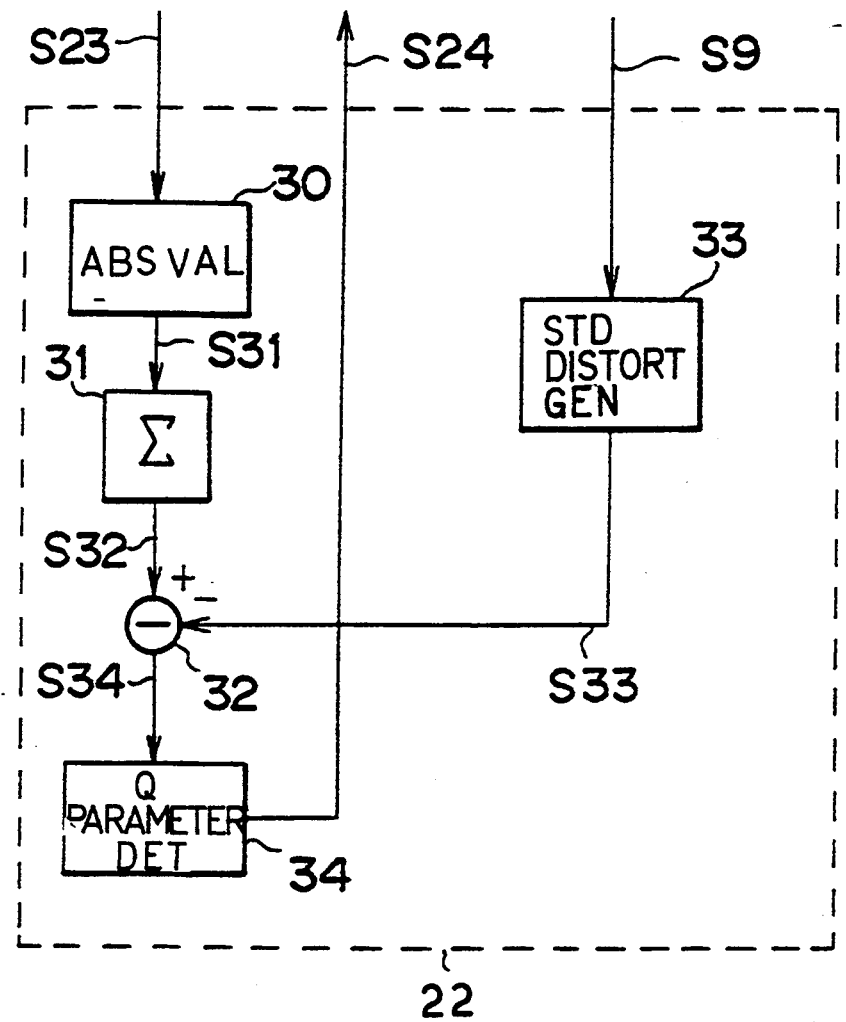
FIG. 6 is a block diagram showing the quantization parameter control circuit of FIG. 5.

FIG. 6 illustrates the quantization parameter control circuit 22 wherein the distortion data S23 received from the distortion calculation circuit 28 is supplied to the absolute value circuit 30 to determine the absolute value of distortion with respect to the original video data S1. The absolute value of distortion is supplied to integration circuit 30 as the absolute difference data S31.

The integration circuit 31 calculates the sum of the absolute difference data S31 received from the absolute circuit 30 for each block and then supplies the calculated value to the subtraction circuit 32 as the integral distortion data S32.

The subtraction circuit 232 calculates the difference between the integral distortion data S32 and the standard distortion data S33 received from the standard distortion generation circuit 33 which comprises read only memory and the like. The calculated difference data S34 are then supplied to the quantization parameter determination circuit 34.

In the above operation, the standard distortion generation circuit 33 predicts the typical or average value of the sum of the absolute values of distortion to occur in each block. The predicted value is based on the control parameters for each block group GOB which are received as the quantization control signals S9 from the transmission buffer memory 10. This predicted value is output as the standard distortion data S33.

The quantization parameter determination circuit 34 outputs the control parameter as control data S24 which determines the quantization step size for each block to minimize the difference data S34, which is the difference between the integral distortion data S32 and the standard distortion data S33. Control data S24 is supplied to the quantization circuit 8 and to the inverse quantization circuit 12 so that picture quality is stably maintained while the video data, which corresponds to the block group GOB processed with the second local decoding circuit block group 21, is being transmitted on transmission line 11.

The first local decoding circuit block group 21A performs inverse quantization for the quantization data S6 based on the quantization control data S9. The quantization control data comprises quantization parameters that are determined for each block group GOB according to the quantization control data S24.

Additionally, in the video data transmission system 20, the transformation data S5 from the discrete cosine transformation circuit 6 is supplied to the quantization circuit 8 after being delayed by delay circuit 36 which comprises the FIFO memory.

In the above operation, the delay circuit 36 delays the transformation data S5 the amount of time needed for processing the video data with the second local decoding circuit block group 21B and the quantization parameter control circuit 22. In other words, the delay equals the amount of time needed to process the video data from the quantization/inverse-quantization circuit 23 through the quantization parameter determination circuit 34. Then the delayed data is supplied to the quantization circuit 8. Thus, the video data transmission system 20 can achieve feed forward operation based on the content of the picture to be transmitted.

Furthermore, in the video data transmission circuit 20, the previous-frame data S2 supplied from the previous-frame memory 4 are output to the previous-frame data generation circuit 14, in the first local decoding circuit block group 21A, delayed by the delay circuit 37.

In the above operation, the delay circuit 37 delays the previous-frame data the amount of time needed for processing by the second local decoding circuit block group 21B and the quantization parameter control circuit 22. As a result, the previous-frame data which was previously transmitted on transmission line 11 can be decoded.

To illustrate the aforedescribed operation of the video data transmission system 20, video data of a picture of a water wheel with the sky in the background will be transmitted. When the video signal VD of the block group GOB corresponding to the boundary between the background (which is not easily degraded) and the vanes of the wheel (which may be easily degraded) is supplied to preprocessing circuit 2, then preprocessing circuit 2 converts the video signal VD to the 8-bit input video data S1 and supplies this converted data to the difference-data generation circuit 3 and the delay circuit 29.

The difference-data generation circuit 3 determines the inter-frame difference data S3, i.e., the difference between the present input video data S1 supplied from preprocessing circuit 2 and the previous-frame data of the corresponding block group supplied from the previous-frame memory 4. Then, 2-dimensional discrete cosine transformation is carried out for each block of data S3 in the discrete cosine transformation circuit.

The transformed data S5 from the discrete cosine transformation circuit 6 is supplied to the delay circuit 36 for delaying data S5 the amount of time needed for the second local coding circuit block group 21B and the quantization parameter control circuit 22 to perform signal processing for the transformation data S5. The delayed data is then supplied to the quantization circuit 8.

While the delay circuit 36 delays transformation data S5 prior to quantizing the data, the second local quantization circuit block group 21B and the quantization parameter control circuit 22 determine the quantization step size for each unit block constituting block group GOB to be transmitted. The quantization step size depends on whether each unit block corresponds to the background which is not easily degraded or corresponds to the boundary between the background and the vanes of the water wheel which may be easily degraded.

That is, in the second local decoding circuit 21B, the transformation data S5 is quantized in the quantization-/inverse-quantization circuit 23, based on quantization control signal S9 which determines the quantization step size for block group GOB. Furthermore, inverse quantization is carried out for that quantized data to generate the representative value. Then, this representative value is transformed by the inverse discrete cosine transformation circuit 24.

Furthermore, in the second local quantization circuit block group 21B, the local decoding circuit 25 is supplied with local decoded values of the previous frame and of the present frame having quantization accuracy determined for each block and generates a single local decoded value. Then the generated local decoded value is supplied to the distortion calculation circuit 28 through the switching circuit 26. The distortion calculation circuit 28 calculates the difference between the decoded data S22 of the present block group and of the original video data S1. The calculated difference is supplied to the quantization parameter control circuit 22 as distortion data S23.

In the quantization parameter control circuit 22, the absolute value circuit 30 determines the absolute value of the distortion data S23 for each block. The summation of the absolute values of the distortion for each block is calculated with the integral circuit 31. Thus, the deviation of the decoded value of each block from the original video data, which would occur if the present quantization step size is utilized, is calculated.

Meanwhile, in the quantization parameter control circuit 22, the standard distortion generation circuit 33 predicts the magnitudes of distortion which might occur for each block. This predicted value is based on the quantization control data S9 which is a control parameter to determine the quantization step size for each block group GOB so that neither overflow nor underflow occurs for the data stored in the transmission buffer memory 11. The predicted value is then supplied to subtraction circuit 32.

Then, the subtraction circuit 32 in the quantization parameter control circuit 22 calculates the difference between the magnitude of actual distortion and that of the standard distortion data S33. This calculated difference data S34 is supplied to the quantization parameter determination circuit 34.

The quantization parameter determination circuit 34, based on the fluctuation in the difference data S34, determines whether the amount of information for each block increases locally with respect to the amount of information which is predicted based on the average quantization step size for each block group GOB.

For example, when a block group GOB has numerous blocks corresponding to the background pattern, there exists a small distortion. Hence, the quantization step size is set relatively large by transmission buffer memory 10. On the other hand, the block corresponding to the boundary between the water wheel and the background has a large distortion. Therefore, a large magnitude of distortion occurs with respect to the magnitude of distortion predicted based on the present quantization step size.

In such a case, the quantization parameter determination circuit 34 reduces the quantization step size for corresponding blocks to increase the distortion to the extent that neither an overflow nor an underflow occurs for the data in the transmission buffer memory 10. Quantization control signal S24 is supplied to both the quantization circuit 8 and the inverse quantization circuit 12 in order to set the control parameters adequately for each block so that no degradation in picture quality occurs at the boundary between the water wheel and the background.

Thereafter, the quantization circuit 8 controls the quantization step size for each block of block group GOB based on the quantization parameters which were previously calculated, while the video data of block group GOB were delayed at the delay circuit 36. The quantized data is then supplied to variable length coding circuit 9 where variable length coding is carried out and the data is transmitted on transmission line 11 through transmission buffer memory 10.

Simultaneously, the inverse quantization circuit 12, in first local decoding circuit block group 21A, performs inverse quantization for the quantization data S6 utilizing the actual quantization step size determined by the quantization control signal S9 and S24. Thus, the video data which was transmitted is decoded in the transmitter and stored in the previous-frame memory 4. Thereafter, the afore operations are repeated in a similar manner.

With the above operation, local decoding of the video signal is carried out before the video signal is quantized and transmitted. The locally decoded value is compared with the original video data to determine the magnitude of distortion for each block. Based on this distortion magnitude, the quantization step size is controlled locally for each block so that averaging the amount of information generated for entire block group GOB is more easily achieved. Further, local degradation in picture quality is avoided even when the amount of local information changes drastically in the same block group.

In the above operation, the summation of the magnitude of the distortion generated in each block in the same group can become substantially the same as the preliminary predicted magnitude of the standard distortion so that irregular distribution of the distortion in the block group can be effectively avoided.

In the embodiment described above, the quantization parameter control circuit 22 utilizes the absolute value of the difference data S23 between the locally decoded video data S22 and the corresponding original input video data S1. However, this invention is not limited to that. For example, the sum of squares of the difference data S23 can be utilized. Further, non-linearly weighted values, etc., can also be utilized.

Furthermore, in the above embodiment, the quantization parameter control circuit 22 predicts the sum of the absolute values of the magnitude of the standard distortion for each block based on the quantization control signal S9 which is the quantization control parameter for each block group GOB. However, this invention is not limited to that. For example, the prediction of the sum of squares of the magnitudes of standard distortion, etc., can be successfully applicable as well.

Furthermore, although the quantization parameter control circuit 22 is illustrated in FIG. 6, this invention is not limited to that. For example, various kinds of circuits are applicable which control the quantization parameter for each block based on the quantization control signals comprising difference data S22, which is the difference between the input video signal of the original input video data S1 and the local decoded video data S22.

In the above embodiment, the picture of a water wheel with the sky in the background is taken as an example of a video signal to be transmitted. However, this invention is not limited to that but is suitable for transmitting any other picture, particularly pictures having amounts of data that change drastically.

In the embodiment described above, the quantization parameters are controlled for each block based on the difference data S22, which is the difference between the original input video data S1 and the local decoded video data S22. Further, the parameters are based on the quantization control signal S9 which comprises the control parameter for each block group GOB. However, this invention is not limited to that but the same object can be achieved by controlling characteristics of filters, etc. Further, this invention is applicable for a wide variety of systems which utilize various kinds of signal processing for transmitting video data.

Figure 7:
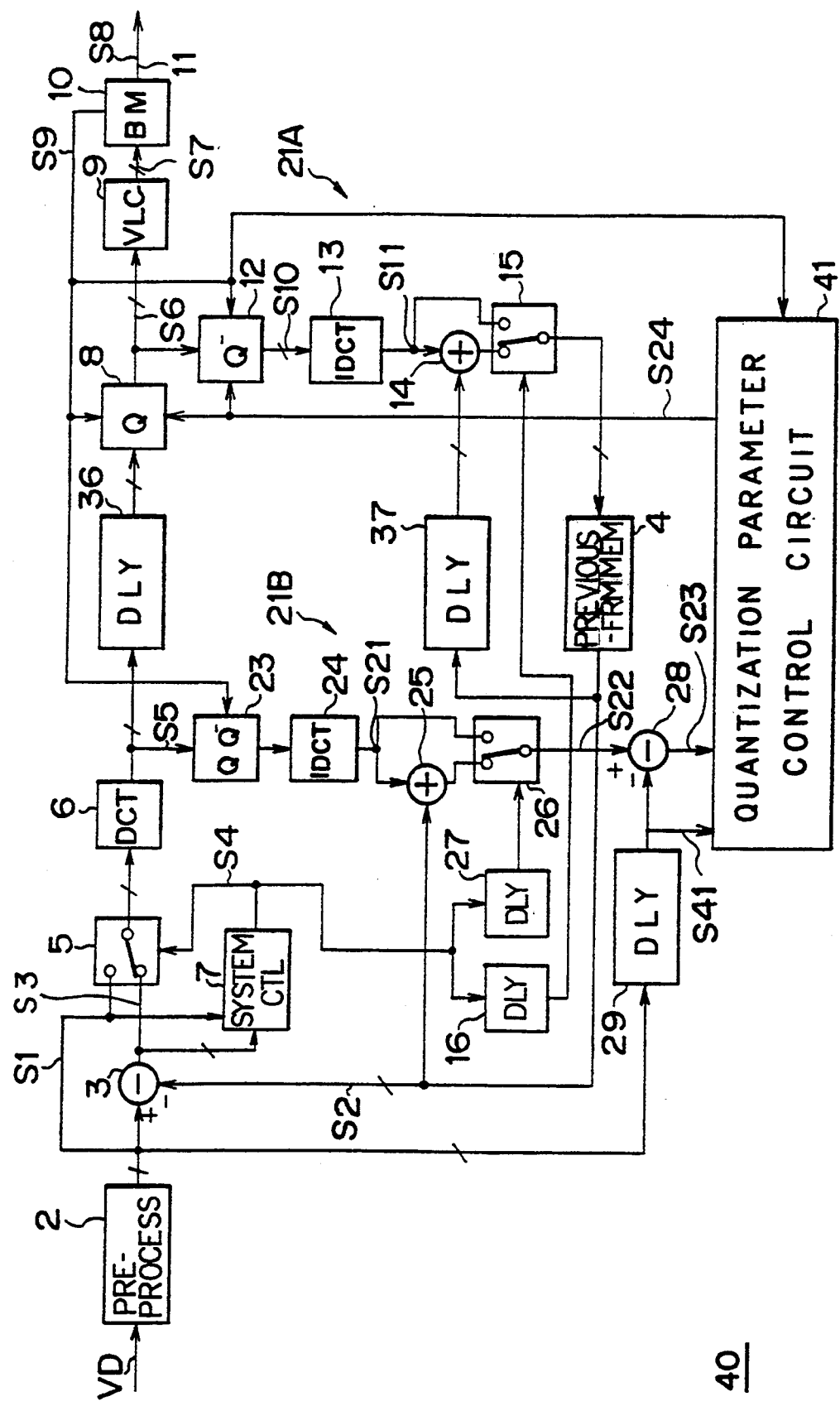
FIG. 7 is a block diagram of a video data transmission system for another embodiment.
Figure 8:
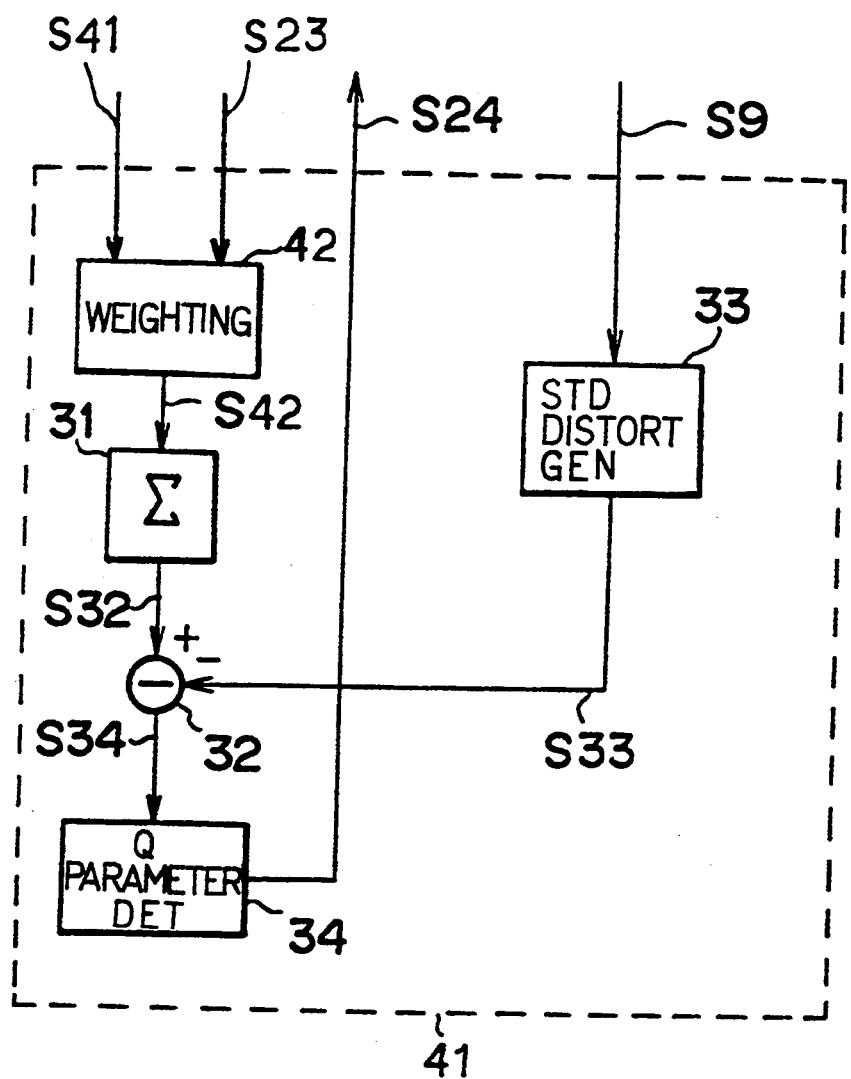
FIG. 8 is a block diagram of a quantization parameter control circuit FIG. 7.

FIGS. 7 and 8 illustrate a further embodiment of the present invention in which like parts are designated by like reference numerals or characters in conjunction with FIGS. 5 and 6.

The quantization parameter control circuit 41 is supplied the distortion data S23 from the distortion calculation circuit 28 and the brightness signal S41 of the original signal from the delay circuit 29.

The quantization parameter control circuit 41 has a weighting circuit 42 which comprises a ROM, etc. and weights the distortion data with the brightness signal 41 to output absolute weighted distortion data as the weighted difference data S42 to the integration circuit 31. Weighting circuit 42 non-linearly weights the distortion data S24 to visually reduce distortion.

In this embodiment, a standard distortion generation circuit 33 predicts the standard or the average absolute summation of distortion which occurred in each block in a typical brightness signal level, based on the control parameter with each block group GOB, input as the quantization control signal S9 from the transmission buffer memory 10, so as to output as the standard distortion data S33.

When the distortion summation data S32 is larger than the standard distortion data S33, the quantization parameter determination circuit 34 outputs the control data to improve the quantization accuracy. Conversely, when the distortion summation data S32 is smaller than the standard distortion data S33, the quantization parameter determination circuit 34 outputs the control data to degrade the quantization accuracy.

Therefore, the picture transmission system 40 adjusts the distortion level based on visual considerations, whereby the volume of information can be used more effectively and a high quality picture transmission can be achieved.

Although in the embodiment above described, the weighting circuit 42 non-linearly weights the distortion data S23, the weighting circuit may also weight linearly.

Moreover, in the embodiment above described, although the brightness signal is input with all data bits thereof, this invention is not limited to this but may supply only the 3 to 5 most significant bits of the brightness signal.

Figure 9:
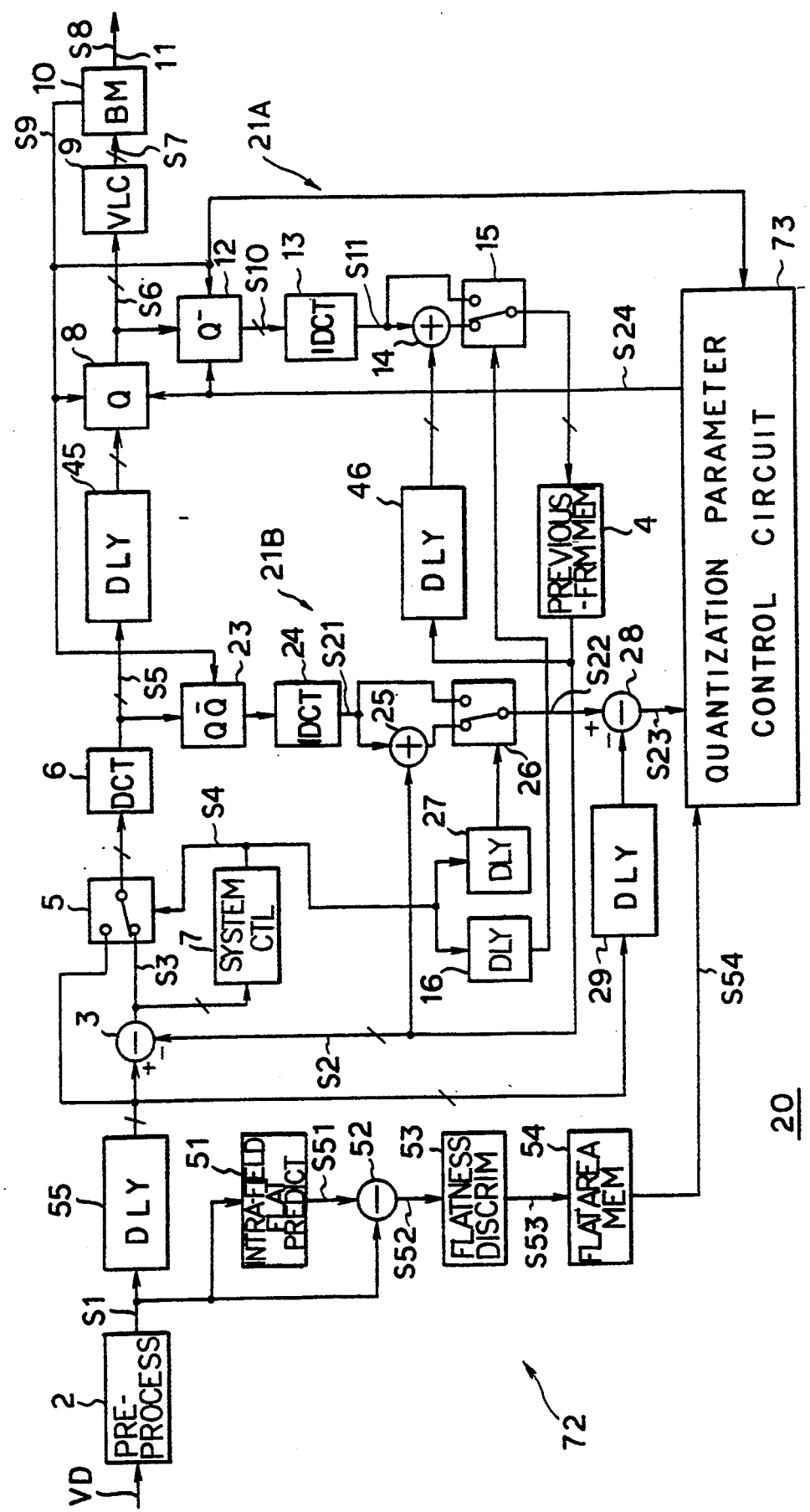
FIG. 9 is a block diagram of a video data transmission system for another embodiment.

In FIG. 9, in which like parts are designated by like reference numerals or characters in conjunction with FIG. 5, the quantization parameter control circuit has a similar construction as FIG. 5, except that the quantization parameter of each block of transmission picture is controlled based on the output result from a flatness discrimination circuit block 72.

The flatness discrimination circuit block group 72 determines the flatness of the transmission data and supplies the result to quantization parameter control circuit 73. Flatness refers to the "flat" portions of the image (as opposed to the "edge" portions) which will appear distorted. In this circuit block group, the original input video data S1 received from the preprocessing circuit 2 are successively supplied to intra-field flatness prediction circuit 51.

Figure 10:
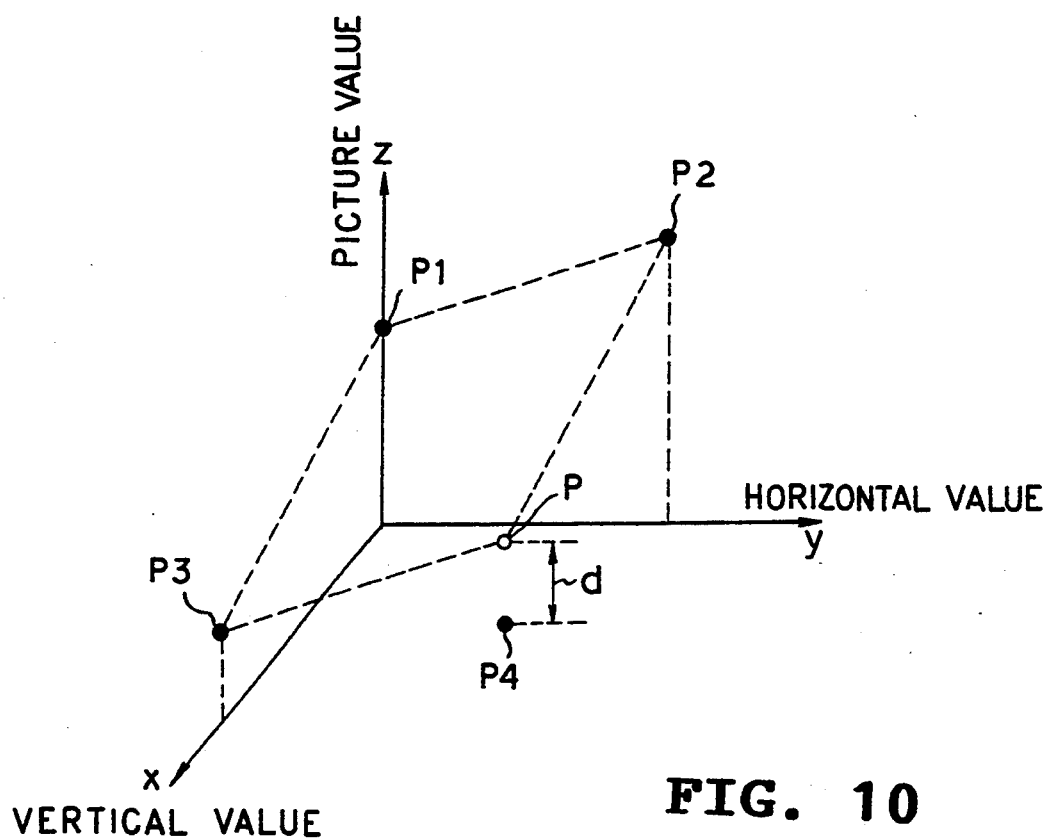
FIG. 10 is a schematic representation for explaining the expectation of flatness with flatness expectation circuit of FIG. 1.

The intra-field flatness prediction circuit 51 determines the 3-dimensional data, $(x_1, y_1, z_1)$, $(x_2, Y_2, z_2)$, and $(x_3, Y_3, z_3)$ corresponding to three picture elements, $P_1$, $P_2$ and $P_3$, respectively, which exist in the same field (see FIG. 10).

The intra-field flatness prediction circuit 51 determines the 3-dimensional predicted data, $(x_{40}, Y_{40}, z_{40})$, of predicted picture element P (denoted by the hollow circle in FIG. 10) from the 3-dimensional data, $(x_1, Y_1, z_1)$, $(x_2, Y_2, z_2)$ and $(x_3, Y_3, z_3)$, assuming that the fourth picture element P4, which is to be transmitted after the first through third picture element, P1 through P3, is located on the same plane on which these three picture elements, P1 through P3, are located. This predicted data is supplied as predicted picture element data S51 to prediction error discrimination circuit 52.

In the above operation, the predicted data, $(X_{40}, Y_{40}, z_{40})$ of predicted picture element P is described by the following equation:

$$(x_{40}, Y_{40}, z_{40}) = (x_2, y_2, z_2) + (x_3, y_3, z_3) - (x_1, y_1, z_1) \quad (1)$$

That is, the first through third picture elements, P1 through P3, and the predicted picture element, P, form a parallelogram. Components of 3-dimensional data (x, y, z) exhibit horizontal and vertical positions in the field and picture element values at their respective points.

Prediction error discrimination circuit 52 determines the difference, d, between picture element value $z_4$ of the fourth picture element P4 and picture element value $z_{40}$ of predicted picture element P. This predicted error d is supplied as predicted error data S52 to the flatness discrimination circuit 53.

The flatness discrimination circuit 53 comprises a ROM (read only memory) and it determines the absolute value of predicted error data S52 received from prediction error discrimination circuit 52. Judging from the determined absolute value, circuit 53 discriminates the flatness of each picture to be transmitted and classifies the flatness into 4 levels: "flat", "almost flat", "slightly flat" and "not flat" which are assigned as 2-bit discrimination data S53, "11", "10", "01" and "00", respectively. This discrimination data S53 is supplied to flat area memory 54.

The flat area memory 54 has two bank memories which can store the data corresponding to 8 lines of the picture to be transmitted. Memory 54 successively stores discrimination data S53 which indicates the flatness at each picture element of the original input video data S1, and supplies stored data S54 to the quantization parameter control circuit 73 at a predetermined timing.

Delay circuit 55 delays original input video data S1 an amount of time and then supplies data S1 to the difference data generation circuit 3. The delay is proportionate to the amount of time it takes to enable the quantization parameter control circuit 73 to process the picture element data corresponding to stored data S54.

The quantization parameter control circuit 73 supplies the quantization control signal S24 for each block to the quantization circuit 8, based on the distortion data S23 received from the distortion calculation circuit 28, the stored data S54 received from the flat area memory 54, and the control data S9 for each block group GOB received from the transmission buffer memory 10.

Figure 11:
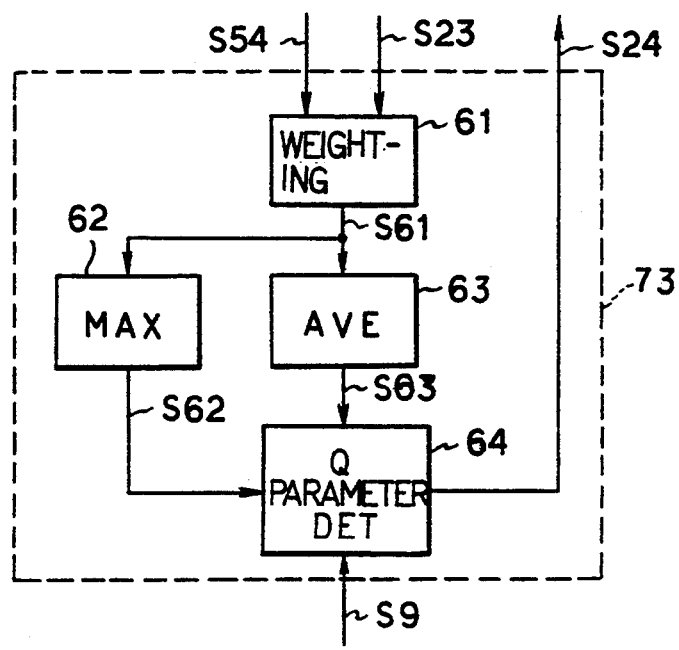
FIG. 11 is a block diagram for explanation of quantization parameter control circuit of FIG. 9.

In the quantization parameter control circuit 73, as shown in FIG. 11, the distortion data S23 and the stored data S34 are supplied to a weighting circuit 61, so as to weight distortion data S23 by the stored data S54 for each picture element. Weighted distortion data S61 is supplied to a maximum circuit 62 and an average circuit 63.

In this way, even if distortion, with respect to the original picture, occurs uniformly, the weighting circuit can perform a greater weighting for the data corresponding to the flat area of the picture where the distortion is readily visible.

The maximum circuit 62 and the average circuit 63 determine the maximum and average values, respectively, of the weighted distortion data S61 and supply these values to a quantization parameter setting circuit 64.

The quantization parameter setting circuit 64, based on the maximum data S62 from the maximum circuit 42, the average data S63 from the average circuit 63, and the quantization control signal S9 from transmission buffer memory 10, sets the control parameter which determines the quantization step size for each block, and outputs the set data as control data S24.

The quantization parameter setting circuit 64 reduces the quantization step size when the amount of information of the video data corresponding to the block group GOB, processed with second local coding circuit block group 21B, increases. The quantization step size is also reduced when the amount of information is constant but the data corresponds to the area, such as flat area, whose distortion can be readily visible, so that the picture quality of the video data to be transmitted on the transmission line 11 can be kept substantially constant.

Inverse quantization circuit, in the first local decoding circuit block group 21A, performs inverse quantization for quantization data S6 based on quantization control data S9 (which is the quantization parameter for each block group GOB) and based on quantization control data S24 (which is the quantization parameter for each block).

Additionally, in the video data transmission system 60, the transformation data S5 from the discrete cosine transformation circuit 6 is supplied to quantization circuit 8 with the adequate delay time at delay circuit 45. Delay circuit 45 comprises a FIFO memory.

In the above operation, the delay circuit 45 delays the coefficient data S5 for the amount of time needed for second local decoding circuit block group 21B to perform local decoding of at least one block, plus the amount of time needed for the quantization parameter setting circuit 64 to determine quantization parameters for each block. The delayed data is then supplied to the quantization circuit 8 which is enabled by control data S24 to perform quantization for each block.

Furthermore, in video data transmission system 60, the previous-frame data generation circuit 14 receives previous-frame data S2 from previous-frame memory through delay circuit 46.

In the above operation, delay circuit 46 delays the previous-frame data for the amount of time needed for second local decoding circuit block group 21B and the quantization parameter control circuit 23 to perform their processing. Then, the delayed data is sent out. Thereafter, the data of the previous-frame which has been already sent out transmission line 11 can be decoded.

In the above described video data transmission system 60, the preprocessing circuit 2 successively converts input video signal VD into 8-bit input video data S1 and supplies the converted data to the delay circuit 55 and to the flatness discrimination circuit block group 22.

The difference-data generation circuit S3 determines the inter-frame difference data S3. Difference data S3 comprises the difference between the data of the present frame received from the delay circuit 55 and the data of the corresponding block group GOB of the previous frame supplied from the previous-frame memory 4. 2-dimensional discrete cosine transformation is carried out for each block of the difference data S3 in the discrete cosine transformation circuit 6.

The delay circuit 45 delays the transformation data S5 for the amount of time needed for the second local coding circuit block group 21B and the quantization parameter control circuit 23 to process the transformation data. S5. The delayed data is then supplied to the quantization circuit 8.

While the delay circuit 45 delays the transformation data S5 prior to quantization, the second local quantization circuit block group 21B and the quantization parameter control circuit 73 determine the quantization step size for each unit block of block group GOB, based on whether that block is such a block where distortion is readily visible.

That is, in the second local decoding circuit 21B, the quantization/inverse-quantization circuit 23 quantizes the transformation data S5 using the quantization control signal S9. The quantized data is then inverse quantized. Thereafter, the inverse discrete cosine transformation circuit 23 inversely transforms the data.

Furthermore, the local decoding circuit 25 is supplied with the local decoded value of the present frame based on the decoded value of the previous frame for each block group GOB. Then the obtained local decoded value is supplied to the distortion calculation circuit 28 through the switching circuit 26. The distortion calculation circuit 28 calculates the difference between the decoded data S22 and the original input video data S1. The obtained difference, distortion data S23, is supplied to the quantization parameter control circuit 73.

While the second local coding circuit block group 21B performs the above processing, the flatness discrimination circuit block group 72 determines whether the picture to be transmitted, which is under the processing with second local coding circuit block group 21B, is a flat pattern whose distortion is readily visible.

In the flatness discrimination circuit block group 72, which receives the original input video data S1, the intra-field flatness prediction circuit 51 determines the positions of the remaining vertex of the parallelogram defined by three picture elements, P1, P2 and P3, located in the same field as the location of the predicted picture element P. Thus, the 3-dimensional predicted picture element data ($x_{40}$, $Y_{40}$, $z_{40}$) is determined and is supplied, as the predicted picture element data S51, to the predicted error discrimination circuit 52.

The predicted error discrimination circuit 52 determines the predicted error d, which is the difference between picture element value $z_{40}$ of the predicted picture element data and the picture element value of the fourth picture element P4 in the video data to be transmitted. Then the flatness is discriminated for each picture element based on predicted error d and represented with a 2-bit code. The 2-bit code are successively stored in the flat area memory 54. The stored data are thereafter supplied to quantization parameter control circuit 73.

In the quantization parameter control circuit 73, weighting circuit 61 weights the distortion data S23 by stored data S54 for each picture element. In other words, the amount of weighting is dependent on the degree of the visibility of the distortion, defined as the difference between the decoded value of each block and the original video signal value, which occurs under the condition of the current quantization step size.

Even in the case, for example, when the amount of information locally increases and a large amount of distortion occurs under the condition of the quantization step size, light weighting is carried out for the picture elements whose distortion is not readily visible.

Conversely, in the case when there is little visible distortion, heavy weighting is carried out for the picture elements in the flat area whose distortion is readily visible.

After that, the quantization parameter setting circuit 64 defines the quantization step size for each block based on the maximum and average data (S62, S63) of the weighted distortion determined for each block. Thereafter, control data S24 is determined and output.

For example, in the case when the amount of information locally increases and substantially the same magnitude of distortion occurs for each block of the picture to be transmitted, the smaller quantization step size is set for the flat area whose distortion is readily visible and the current step size is maintained for the pattern whose distortion is not readily visible.

In this way, a greater amount of information is allocated for the pattern whose distortion is readily visible. Therefore, a more effective utilization of information is achieved.

Finally, based on the quantization parameter which was determined before the present video data of the block group is transmitted, the quantization circuit 8 changes the quantization step size to give the optimum step size for each block. The quantized data is then supplied to the variable length coding circuit 9 and ultimately out through the transmission buffer memory 10 to the transmission line 11.

At the same time, the inverse quantization circuit 12, in the first local decoding circuit block group 21A, performs inverse quantization for the quantization data S6 utilizing the actual quantization step size determined by the control data S24. Thus, the video data which was transmitted is reproduced in the transmitter and stored in the previous-frame memory 4.

In the above operation, local decoding of the video signal is carried out before the video signal is quantized and transmitted. The locally decoded value is compared with the original input video data to determine the magnitude of distortion. Furthermore, the magnitude of the distortion is weighted depending on the degree of visibility of the distortion. Based on this weighted distortion magnitude, the quantization step size is controlled locally to achieve a better picture quality even when the amount of information changes locally and drastically.

In the above embodiment, the plane expectation for each picture element in a field is carried out based on the equation (1). However, this invention is not limited to that, but another condition may be utilized for the plane expectation.

Further, in the above embodiment, expected picture element P is obtained by a single plane expectation. However, this invention is not limited to that since a multitude of plane expectations may lead to better prediction accuracy of the predicted picture element P.

Additionally, in the above embodiment, the picture is considered to be plane when predicted picture P coincides with original picture element P4. However, this invention is not limited to that but the picture may be considered to be plane when original picture element P4 is located in a region near the predicted picture element P.

In the above embodiment, the flatness discrimination circuit 53 utilizes the absolute value of the predicted error d to show the degree of flatness. However, this invention is not limited to that but it can utilize, for example, the square of the predicted error d, or a nonlinear function of the predicted error d, and so on.

In the embodiment described above, the flatness discrimination circuit 53 is composed by read only memory. However, this invention is not limited to that but the flatness for each picture element cart be obtained by another calculating process.

Further, in the above embodiment, the flatness of video data is described by 2-bit data. However, this invention is not limited to that but it can be described by 1-bit or plural bit data.

Additionally, in the above embodiment, flat area memory 54 is composed by 2 sets of memory which store the data for 8 lines. However, this invention is not limited to that but it can be composed to store the data for 16 lines, or one field, and so on.

Also, in the above embodiment, weighting circuit 61 is composed by read only memory. However, this invention is not limited to that but it can be composed by a multiplier, etc.

Furthermore, in the above embodiment, weighting circuit 61 weights linearly distortion data S23 by stored data S54. However, this invention is not limited to that but it can weight non-linearly distortion data.

Additionally, in the above embodiment, the quantization parameter setting circuit 64 sets quantization parameter for each block based on the maximum data S62 and the average data S43. However, this invention is not limited to that but it can set the quantization parameter based on either the maximum or average data or based on the standard deviation of the data.

Furthermore, in the above embodiment, quantization parameter control signal S9 is fed back from the transmission buffer memory 10 to the quantization parameter control circuit 23. However, this invention is not limited to that but quantization parameter can be set for each block based only on distortion data S23 and stored data S54 with no feedback of quantization control signal S9.

While the present invention has been described in connection with the preferred embodiments of the invention, it will be appreciated by those skilled in the art that various changes and modifications may be made therein without departing from the spirit and scope of the invention, and it is aimed, therefore, to cover in the appended claims all such changes and modifications which fall within the true spirit and scope of the invention.

What is claimed is:

1. A video signal transmission system comprising:
    means for orthogonally transforming an input video signal, which is constituted by unit block groups each having a plurality of unit blocks, into coefficient data;
    local decoding means for quantizing and inverse-quantizing said coefficient data based on first quantization information determined for each of said unit blocks, said local decoding means including means for inverse-orthogonally transforming the quantized and inversely quantized coefficient data;
    difference data detecting means for detecting difference data between the data decoded by said local decoding means and the corresponding input video signal;
    controlling means for determining second quantization information for each of said unit blocks based on the difference data of said difference data detecting means; and
    quantizing means for determining a quantizing size of said coefficient data based on said first quantization information and said second quantization information.

2. The video signal transmission system according to claim 1, wherein said controlling means includes:
    distortion calculating means for calculating a calculated distortion value for each of said unit blocks based on said difference data;
    standard distortion calculating means for calculating a standard distortion value for each of said unit blocks based on said first quantization information;
    distortion value comparing means for comparing said calculated distortion value and said standard distortion value from said distortion calculating means and said standard distortion calculating means, respectively; and
    quantization information control means for controlling said second quantization information for each of said unit blocks based on the comparison result of said distortion value comparing means.

3. The video signal transmission system according to claim 1, wherein said controlling means includes:
    distortion calculating means for calculating a calculated distortion value based on said difference data and a brightness signal corresponding to the inverse-orthogonally transformed coefficient data;
    standard distortion calculating means for calculating a standard distortion value for each of said unit blocks based on said first quantization information;
    distortion value comparing means for comparing said calculated distortion value and said standard distortion value; and
    quantization information controlling means for controlling said second quantization information for each of said unit blocks based on the comparison result of said distortion value comparing means.

4. A video signal transmission system comprising:
    means for orthogonally transforming an input video signal, which is constituted by unit block groups each having a plurality of unit blocks constituted by picture elements, into coefficient data;
    local decoding means for quantizing and inverse-quantizing said coefficient data based on first quantization information determined for each of said unit blocks, said local decoding means including means for inverse-orthogonally transforming the quantized and inversely quantized coefficient data;
    difference data detecting means for detecting difference data between the data decoded by said local decoding means and the corresponding input video signal;
    flatness detecting means for detecting flat portions of each picture element constituting each of said unit blocks;
    controlling means for determining second quantization information for each of said unit blocks based on the detected flat portions and said difference data; and
    quantizing means for determining a quantizing size of said coefficient data based on said first quantization information and said second quantization information.

5. The video signal transmission system according to claim 4, wherein said flatness detecting means includes:
    flatness predicting means for predicting 3-dimensional data of each said picture element corresponding to said input video data;
    difference detecting means for detecting difference data between said 3-dimensional data predicted by said flatness predicting means and said corresponding input video signal; and
    flatness discriminating means for discriminating between predetermined degrees of flat portions of said picture elements based on said difference data.

6. The video signal transmission system according to claim 4, wherein said controlling means includes:
    means for generating weighted distortion data from said detected flat portions and said difference data;
    distortion calculating means for calculating a calculated distortion value for each of said unit blocks on the basis of said weighted distortion data; and
    quantization information controlling means for determining second quantization information for each of said unit blocks based on said calculated distortion value.

7. The video signal transmission system according to any one of claims 1 through 6, further comprising:
    means for variable length coding the coefficient data quantized by said quantizing means; and
    memory means for storing the variable length coded data and supplying at least a portion of the stored data to a transmission line based on a transmission rate, and supplying the data remaining in said memory means as said first quantization information to said quantizing means.

8. A video signal transmission method comprising the steps of:
    orthogonally transforming an input video signal, which is constituted by unit block groups each having a plurality of unit blocks, into coefficient data;
    quantizing and inverse-quantizing said coefficient data based on first quantization information determined for each of said unit blocks, and inverse-orthogonally transforming the coefficient data that has been quantized and inverse quantized;

detecting difference data between the inverse-orthogonally transformed coefficient data and the corresponding input video signal;

determining second quantization information for each of said unit blocks based on said difference data; and determining a quantizing size of said coefficient data on the basis of said first quantization information and said second quantization information.

9. The video signal transmission method according to claim 8, wherein said step of determining said second quantization information includes the steps of:

calculating a calculated distortion value for each of said unit blocks based on said difference data;

calculating a standard distortion value for each of said unit blocks based on said first quantization information; and comparing said calculated distortion value and said standard distortion value.

10. The video signal transmission method according to claim 8, wherein said step of determining said second quantization information includes the steps of:

calculating a calculated distortion value for each of said unit blocks based on said difference data and a brightness signal corresponding to the inverse-orthogonally transformed coefficient data;

calculating a standard distortion value for each of said unit blocks based on said first quantization information; and comparing said calculated distortion value and said standard distortion value.

11. A video signal transmission method comprising the steps of:

orthogonally transforming an input video signal, which is constituted by unit block groups each having a plurality of unit blocks constituted by picture elements, into coefficient data;

quantizing and inverse-quantizing said coefficient data based on first quantization information determined for each of said unit blocks, and inverse-orthogonally transforming the coefficient data that has been quantized and inverse-quantized;

detecting difference data between the inverse-orthogonally transformed data and the corresponding input video signal;

detecting flat portions of said picture elements constituting said unit blocks;

determining second quantization information for each of said unit blocks based on the detected flat portions and said difference data; and quantizing said coefficient data on the basis of said first quantization information and said second quantization information.

12. The video signal transmission method according to claim 11, wherein said step for detecting said flat portions comprises the steps of:

predicting 3-dimensional data of each of said picture elements corresponding to said input video data;

determining difference data between said 3-dimensional data and said corresponding input video signal; and discriminating between predetermined degrees of flat portions of said picture elements on the basis of said difference data.

13. The video signal transmission method according to claim 11, wherein said step for determining said second quantization information comprises the steps of:

generating weighted distortion data from detected flat portions and said difference data;

determining a calculated distortion value for each of said unit blocks based on said weighted distortion data; and determining second quantization information for each of said unit blocks based on said calculated distortion value.

14. The video signal transmission method according to any one of claims 8 through 13, said video signal transmission method further comprising the steps of:

variable length coding the coefficient data quantized on the basis of said first and second quantization information;

temporarily storing the variable length coded data in a memory and supplying at least a portion of the stored data to a transmission line at a determined transmission rate; and adjusting said first quantization information on the basis of the data remaining in said memory.

* * * * *